(12) United States Patent
Rossi

(10) Patent No.: US 10,909,823 B2
(45) Date of Patent: Feb. 2, 2021

(54) HOME SECURITY LIGHT BULB ADAPTER

(71) Applicant: Russell Rossi, Boca Raton, FL (US)

(72) Inventor: Russell Rossi, Boca Raton, FL (US)

(73) Assignee: Heidi Bear Enterprises, LLC, Sarasota, FL (US)

( * ) Notice: Subject to any disclaimer, the term of this patent is extended or adjusted under 35 U.S.C. 154(b) by 0 days.

(21) Appl. No.: 16/233,288

(22) Filed: Dec. 27, 2018

(65) Prior Publication Data

US 2020/0211341 A1 Jul. 2, 2020

(51) Int. Cl.
| | |
|---|---|
| *G08B 13/196* | (2006.01) |
| *H04N 5/225* | (2006.01) |
| *G08B 25/10* | (2006.01) |
| *H01R 33/02* | (2006.01) |
| *G08B 21/22* | (2006.01) |
| *H04N 7/18* | (2006.01) |
| *H05B 47/105* | (2020.01) |

(52) U.S. Cl.
CPC ........... *G08B 13/196* (2013.01); *G08B 21/22* (2013.01); *G08B 25/10* (2013.01); *H01R 33/02* (2013.01); *H04N 5/2252* (2013.01); *H04N 7/183* (2013.01); *H05B 47/105* (2020.01)

(58) Field of Classification Search
None
See application file for complete search history.

(56) References Cited

U.S. PATENT DOCUMENTS

| | | | | |
|---|---|---|---|---|
| 4,736,218 A | * | 4/1988 | Kutman | F16M 11/18 348/143 |
| 8,267,361 B1 | * | 9/2012 | Dordick | F16M 11/14 248/181.1 |
| 9,021,044 B2 | * | 4/2015 | Blustein | H04L 12/2818 709/208 |
| 9,053,622 B2 | * | 6/2015 | Scalisi | H04N 5/23238 |
| 9,165,444 B2 | * | 10/2015 | Scalisi | H04N 7/183 |
| 9,228,731 B2 | * | 1/2016 | Chen | F21V 23/0464 |
| 9,519,203 B1 | * | 12/2016 | Kennair, Jr. | G03B 17/563 |
| D811,463 S | * | 2/2018 | Kim | D16/203 |
| 10,178,209 B1 | * | 1/2019 | Hesse | H04M 1/04 |
| 10,271,019 B1 | * | 4/2019 | Berg | H04N 5/2256 |
| 10,774,995 B2 | * | 9/2020 | Shim | F21K 9/235 |
| 2003/0197807 A1 | * | 10/2003 | Wu | G08B 13/19619 348/375 |
| 2009/0015396 A1 | * | 1/2009 | Yeh | H04B 3/54 340/538.17 |
| 2012/0239773 A1 | * | 9/2012 | Blustein | H04L 12/2838 709/208 |
| 2013/0050495 A1 | * | 2/2013 | Chen | F21V 23/0471 348/151 |
| 2014/0263249 A1 | * | 9/2014 | Miller | B23K 9/0956 219/137.31 |

(Continued)

*Primary Examiner* — Fekadeselassie Girma
(74) *Attorney, Agent, or Firm* — Kern Kendrick, LLC; Benjamin E. Kern; Thomas Y. Kendrick

(57) ABSTRACT

A home security light bulb adapter includes a bulb connector having male threads, a bulb socket having female threads, a camera, sensors, a wireless communications interface, and a processor. When the bulb connector is connected to a bulb fixture, the camera and the bulb socket are switched on when the sensors sense a motion. The processor then sends data to a remote device over a network via the wireless communications interface.

20 Claims, 4 Drawing Sheets

(56) References Cited

U.S. PATENT DOCUMENTS

| | | | | |
|---|---|---|---|---|
| 2014/0352161 | A1* | 12/2014 | Ranieri | G01C 15/004 33/291 |
| 2016/0100083 | A1* | 4/2016 | Harrison | F16M 11/041 348/373 |
| 2016/0134846 | A1* | 5/2016 | Miller | G08B 13/19656 348/151 |
| 2016/0255697 | A1* | 9/2016 | Bhide | F21S 9/02 315/161 |
| 2016/0313630 | A1* | 10/2016 | Elmohtaseb | G03B 17/561 |
| 2017/0124823 | A1* | 5/2017 | Smith | G08B 13/19669 |
| 2017/0168375 | A1* | 6/2017 | Lajoie | F16M 11/16 |
| 2017/0235213 | A1* | 8/2017 | Clearman | F16M 11/22 396/428 |
| 2017/0244934 | A1* | 8/2017 | Chien | H04N 5/2256 |
| 2018/0013986 | A1* | 1/2018 | Chien | F21V 21/14 |
| 2018/0033273 | A1* | 2/2018 | Siminoff | H04R 1/028 |
| 2018/0035084 | A1* | 2/2018 | Swiss | H04N 7/183 |
| 2018/0191931 | A1* | 7/2018 | Bly | G08B 13/1966 |
| 2018/0332204 | A1* | 11/2018 | Chien | F21V 21/30 |
| 2018/0367713 | A1* | 12/2018 | Gilbert | F16M 11/14 |
| 2019/0208765 | A1* | 7/2019 | D'Acquisto | F41H 3/00 |
| 2019/0246019 | A1* | 8/2019 | Tian | H04N 5/2252 |
| 2019/0246074 | A1* | 8/2019 | Sebree | H04N 5/22521 |
| 2019/0253670 | A1* | 8/2019 | Chien | F21S 4/28 |
| 2019/0310535 | A1* | 10/2019 | Kenny | F16M 11/16 |
| 2020/0170750 | A1* | 6/2020 | Coppersmith | A61B 90/30 |
| 2020/0201146 | A1* | 6/2020 | Freeman | H04N 5/2252 |

* cited by examiner

HOME SECURITY LIGHT BULB ADAPTER

BACKGROUND OF THE INVENTION

The present invention relates to a home security system with an easy-to-install screw bulb connector that screws into bulb sockets of pre-installed lighting fixtures.

Currently, to install security cameras and incorporate a light fixture with the camera, the user must replace the existing fixture. An entire replacement can be expensive and time consuming. Further, replacing the fixture yourself can be very dangerous and often times the consumer hires a professional for proper installation.

As can be seen, there is a need for a home security light bulb adapter connectable to an existing light fixture using standard light bulb sockets and not having to hardwire a new fixture.

SUMMARY OF THE INVENTION

In one aspect of the present invention, a home security light bulb adapter comprises: a bulb connector comprising male threads; a bulb socket comprising female threads and electrically connected to the bulb connector; a camera electrically connected to the bulb connector; sensors electrically connected to the bulb connector; a wireless communications interface electrically connected to the bulb connector; and a processor electrically connected to the bulb connector, wherein when the bulb connector is connected to bulb fixture, the camera and the bulb socket are switched on when the sensors sense a motion, and the processor sends video signals to a device via the wireless communications interface. In summation, the home security light bulb adapter is powered through the electrical connections of the existing light fixture. It is therefore compatible with a single socket lighting fixture and a double socket lighting fixture. For the double socket lighting fixture, a secondary adapter containing wireless technology communicates with the primary adapter containing all security technologies. It is necessary to have the secondary adapter not only for a uniform appearance, but also functionality of another light bulb working simultaneously with the other socket's on and off function. By having this dual adapter, the user is able to turn on and shut off both light bulbs simultaneously.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
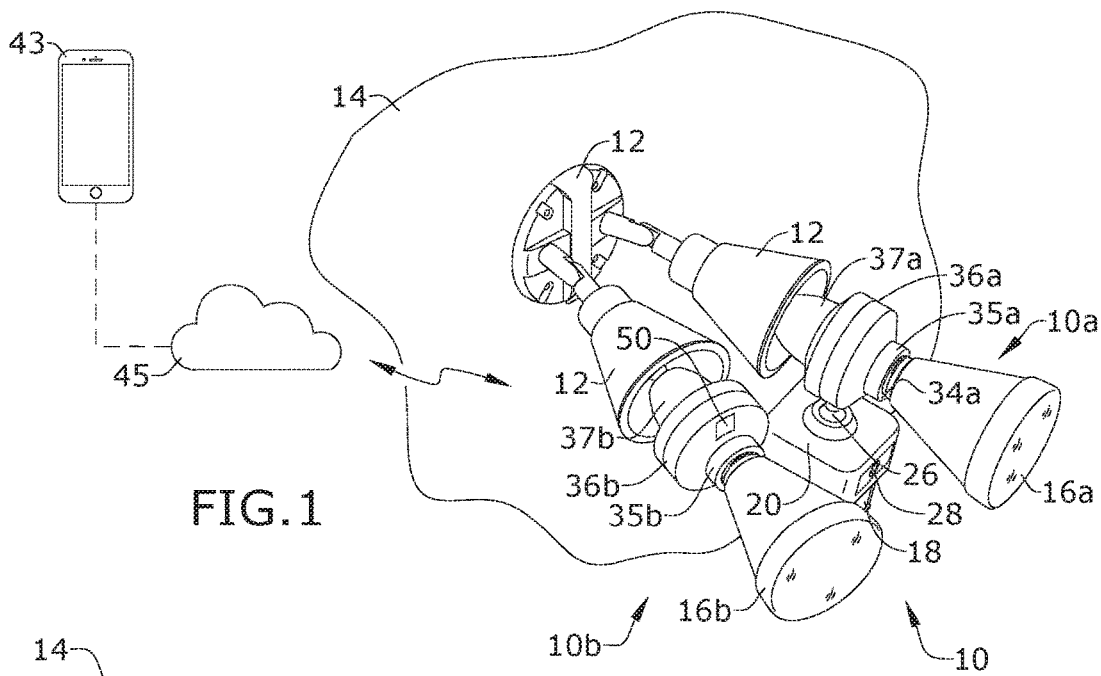
FIG. 1 is a perspective view of an embodiment of the present invention.
Figure 2:
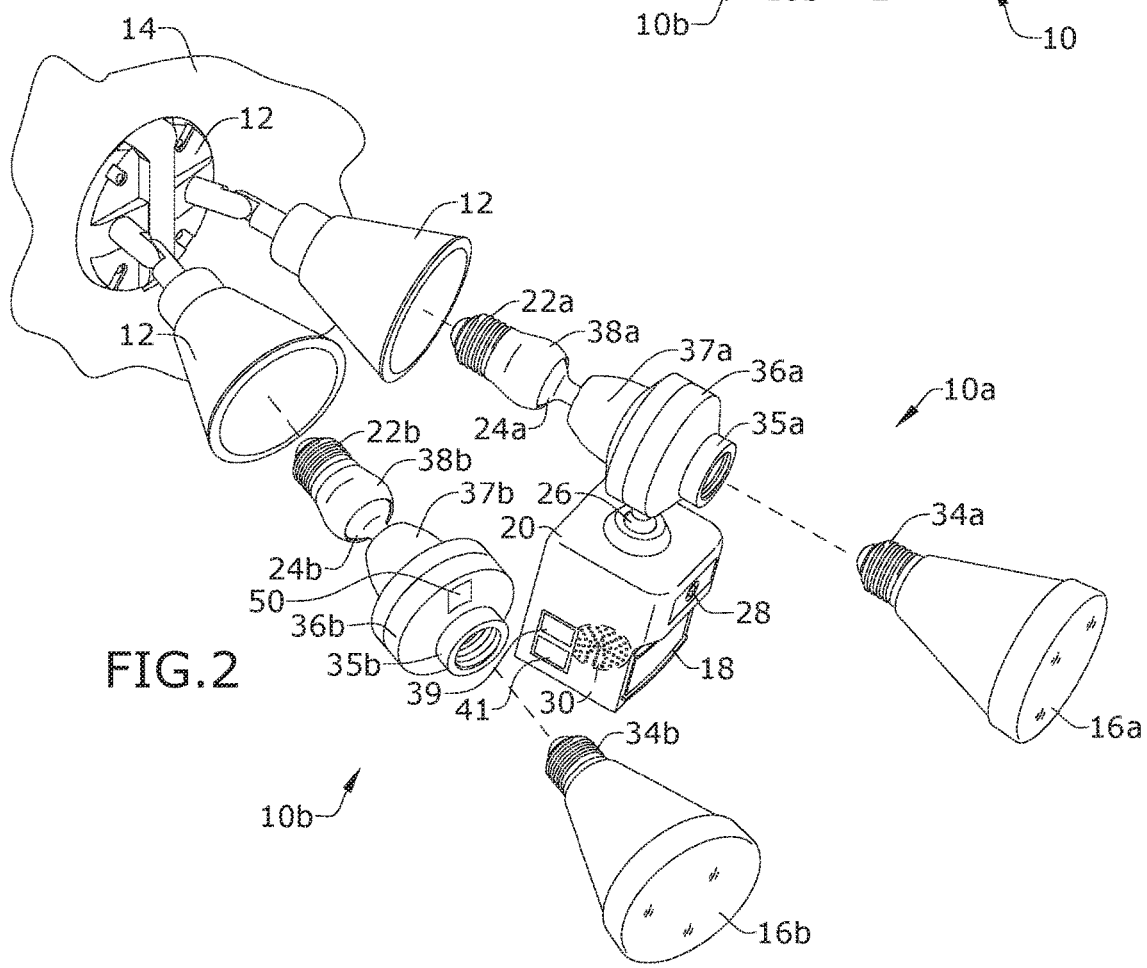
FIG. 2 is an exploded view of an embodiment of the present invention.
Figure 3:
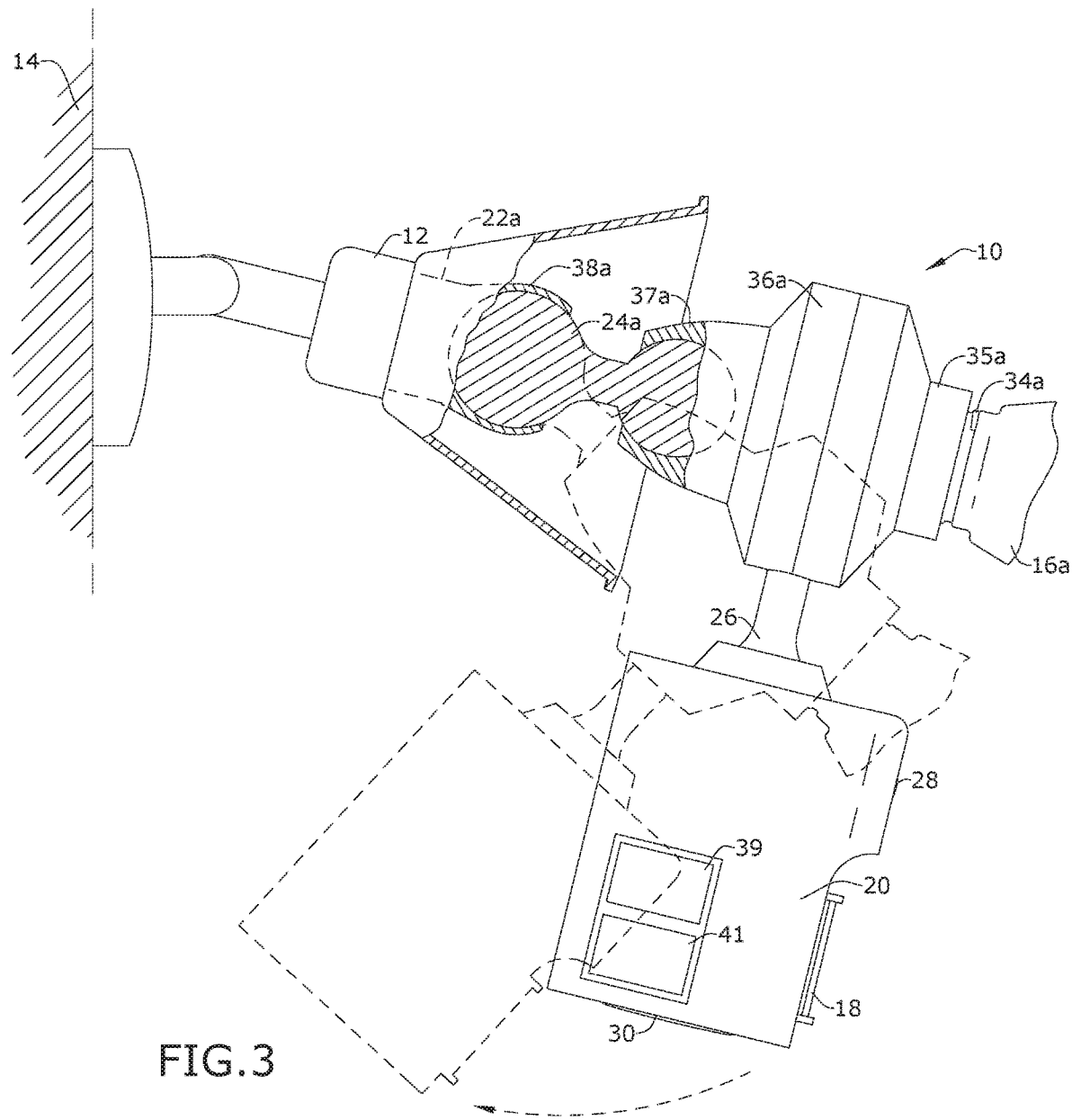
FIG. 3 is a side view of an embodiment of the present invention.
Figure 4:
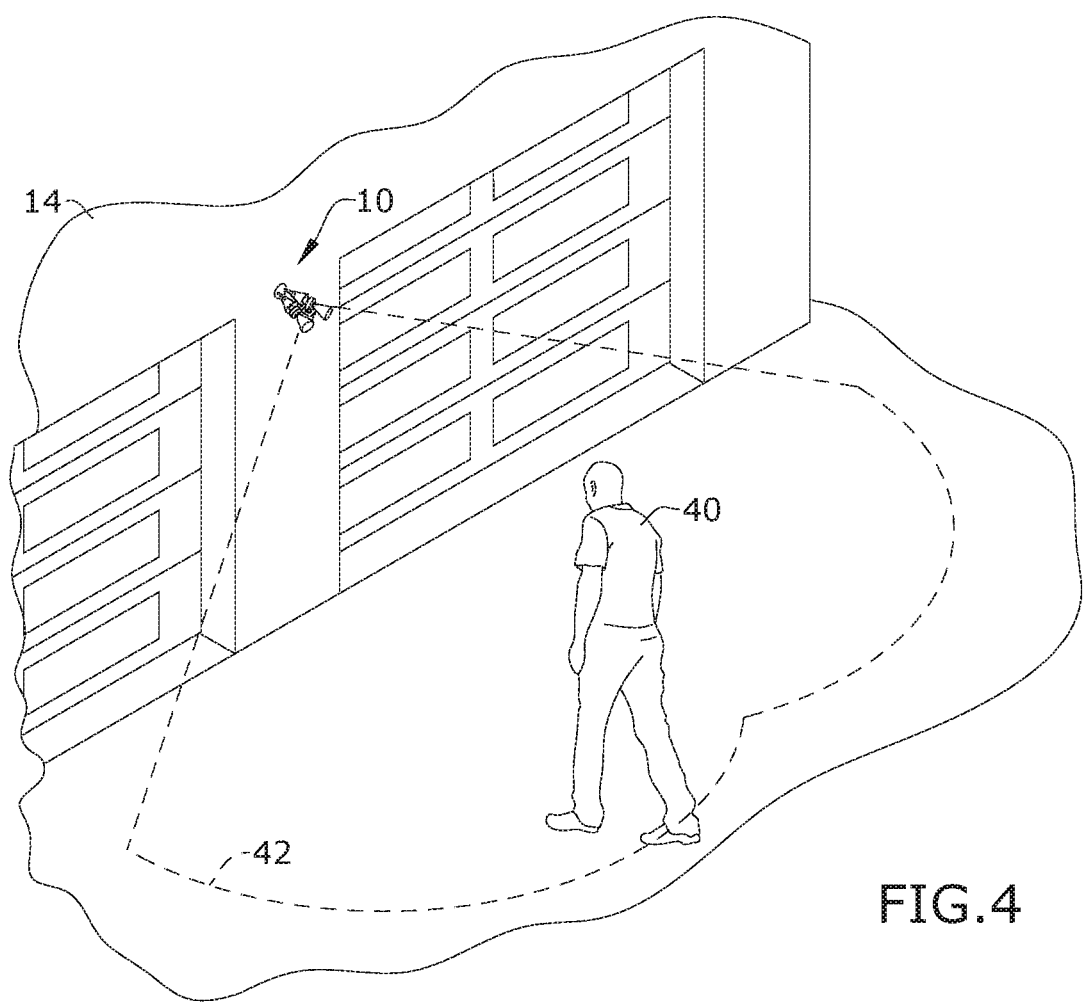
FIG. 4 is a perspective view of an embodiment of the present invention.
Figure 5:
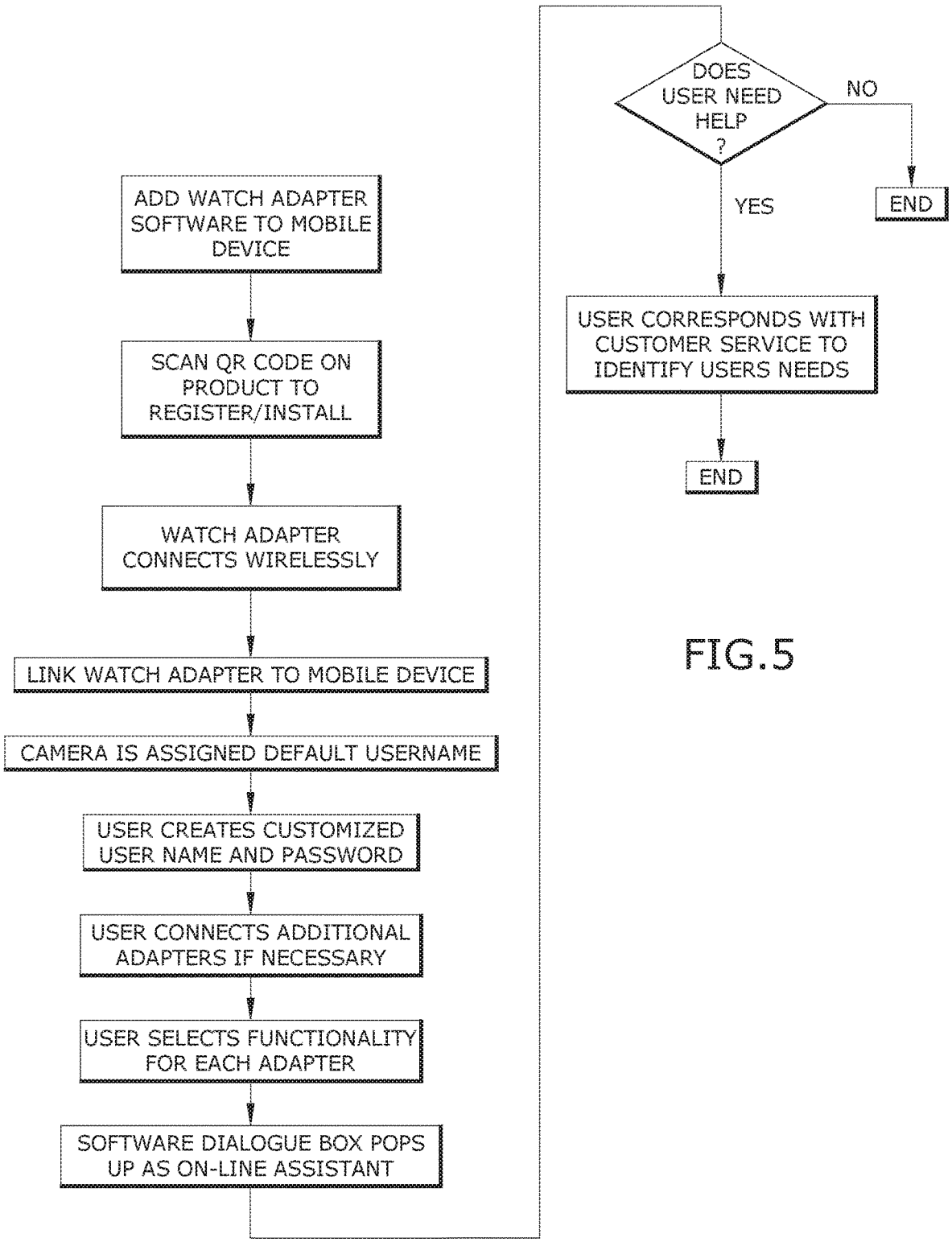
FIG. 5 is a flow chart of an embodiment of the present invention.

Referring to FIGS. 1 through 5, the present invention includes a home security light bulb adapter 10. The home security light bulb adapter 10 may include a primary adapter 10a and a secondary adapter 10b. The primary adapter 10a includes a bulb connector 22a having male threads. The primary adapter 10a further includes a bulb socket 35a having female threads. The bulb socket 35a is electrically connected to the bulb connector 22a. A camera 28 and sensors 18 are electrically connected to the bulb connector 22a. The camera 28 may have night vision capabilities. The adapter 10 further includes a wireless communications interface 39 and a processor 41 electrically connected to the bulb connector 22a. When the bulb connector 22a is connected to a bulb fixture 12 of a wall 14, the camera 28 and the bulb socket 35a are switched on when the sensors 18 sense a motion. The processor 41 then sends video signals to a remote device 43 over a network 45 via the wireless communications interface 39.

The remote device 43 of the present invention may be a laptop, desktop, or a smart device, such as a smart phone or a tablet with a computing system. The computing system is at least a processor and a memory. The computing system may execute on any suitable operating system such as IBM's zSeries/Operating System (z/OS), MS-DOS, PC-DOS, MAC-iOS, WINDOWS, UNIX, OpenVMS, ANDROID, an operating system based on LINUX, or any other appropriate operating system, including future operating systems.

In particular embodiments, the computing system includes a processor, memory, a user interface, and a communication interface. In particular embodiments, the processor includes hardware for executing instructions, such as those making up a computer program. The memory includes main memory for storing instructions such as computer program(s) for the processor to execute, or data for processor to operate on. The memory may include an HDD, a Secure Digital (SD), a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface includes hardware, software, or both providing one or more interfaces for user communication with the computing system. As an example and not by way of limitation, the user interface may include a keyboard, keypad, microphone, monitor, mouse, printer, scanner, speaker, still camera, stylus, tablet, touchscreen, trackball, video camera, another user interface or a combination of two or more of these.

The communication interface 39 of the computing system and the adapter 10 include hardware, software, or both providing one or more interfaces for communication (e.g., packet-based communication) between the adapter 10 and one or more other computing systems or one or more networks 45. As an example and not by way of limitation, communication interface may include a network interface controller (NIC) or network adapter for communicating with an Ethernet or other wire-based network or a wireless NIC (WNIC) or wireless adapter for communicating with a wireless network 45, such as a WI-FI network. This disclosure contemplates any suitable network and any suitable communication interface. As an example and not by way of limitation, the adapter 10 and computing system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The adapter 10 and computing system may include any suitable communication interface for any of these networks, where appropriate.

In certain embodiments, the primary adapter 10a of the present invention includes a housing 20. The housing 20 may include a circuit board. The processor 39 the communications interface 41, the sensors 18, and the camera 28 may be disposed within the housing 20 and may be electrically connected to the circuit board. The primary adapter 10a may further include an electrical joint housing 36a electrically connecting the housing 20, the bulb connector 22a, and the bulb socket 35a.

In certain embodiments, the bulb connector 22a is coupled to the electrical joint housing 36a by a first ball joint 24a. For example, the first ball joint 24a is disposed within a first socket 38a of the bulb connector 22a and a second socket 37a of the electrical joint housing 36a. The first ball joint 24a allows the electrical joint housing 36a to be moveable along an x axis and y axis relative to the bulb connector 22a. In certain embodiments, the housing 20 is coupled to the electrical joint housing 36a by a second ball joint 26, allowing the housing 20 to rotate along an axis relative to the electrical joint housing 36a. The first and second ball joint connections allow a user to position the sensors 18 and camera 28 to point to a desired location relative to the bulb fixture 12.

The primary adapter 10a of the present invention may further include a speaker and a microphone 30. The speaker and microphone 30 are coupled to the housing 20, electrically coupled to the circuit board, and thereby electrically connected to the bulb connector 22a. In such embodiments, the microphone 30 is also switched on when the sensors 28 senses a motion.

In certain embodiments, the remote device 43 receives video signals from the primary adapter 10a and also sends commands to the primary adapter 10a. In such embodiments, a software may be loaded on the memory of the remote device 43. For example, an application may be loaded on a smart phone. Once the application is loaded on a smart phone, the primary adapter(s) 10a are registered. The primary adapter 10a is then connected to a wireless network 45 and the remote device 43 may now wirelessly communicate with the primary adapter 10a over the network 45. The remote device 43 may wirelessly communicate with the processor 41 of the primary adapter 10a via the wireless communications interface 39 to turn the sensors on and off. Further, the remote device 43 may be used to adjust the proximity range 42 of the sensors 18.

When the sensors 18 are turned on and thereby activated, the camera 28, the speaker and microphone 30, and the bulb socket 35a are switched on when the sensors 18 sense a motion by a potential intruder 40 within a proximity range 42 of the sensors 18. If a light bulb 16a is attached to the bulb socket 35, the light bulb 16a turns on. An alert is sent to the remote device 43, indicating that the motion sensors 18 has sensed the motion. The video and sound signals are also sent to the remote device 43, such as a live feed of the camera 28 and a live feed of the speaker and microphone 30. In certain embodiments, the remote device 43 wirelessly communicates with the processor 41 via the wireless communications interface 39 to control an output of the speaker 30 for a two-way remote communication. A user initiates a button on the remote device 43 and begins to speak. An audio signal is sent to the primary adapter 10a via the communications interface 39 and a live feed of the user's audio is produced by the speaker 30. For example, the user may remotely instruct the intruder 40 to leave the property. Additionally, the user may initiate a siren to play on the speaker 30 of the adapter 10 to scare the intruder 40 away. Moreover, the adapter 10 enables the user to access the lighting fixture's 12 functions remotely—turning the light function on and off, setting a timer, using as an every-day light, and two-way communication all through the wireless communications interface 39.

In certain embodiments, the present invention may include a secondary adapter 10b. The secondary adapter 10b includes a bulb connector 22b having male threads. The secondary adapter 10b further includes a bulb socket 35b having female threads. The bulb socket 35b is electrically connected to the bulb connector 22b. An electrical joint housing 36b electrically connects, the bulb connector 22b and the bulb socket 35b. The secondary adapter 10b further includes a wireless communications interface 50 disposed within the electrical joint housing 36b that is electrically connected to the bulb connector 22b. When the bulb connector 22b is connected to a bulb fixture 12 of a wall 14, the wireless communications interface 50 and the bulb socket 35b are powered.

Similar to the primary adapter 10a, a first ball joint 24b is disposed within a first socket 38b of the bulb connector 22b and a second socket 37b of the electrical joint housing 36b. The first ball joint 24b allows the electrical joint housing 36b to be moveable along an x axis and y axis relative to the bulb connector 22b.

The wireless communications interface 50 may include an RFID chip. The wireless communications interface 50 syncs with the wireless communications interface 39 of the primary adapter 10a. In such embodiments, when the sensors 18 of the primary adapter 10 sense a motion, the light bulb 16b coupled to the bulb socket 35b of the secondary adapter 10b turns on simultaneously with the light bulb 16a coupled to the bulb socket 35a of the primary adapter 10a.

It should be understood, of course, that the foregoing relates to exemplary embodiments of the invention and that modifications may be made without departing from the spirit and scope of the invention as set forth in the following claims.

What is claimed is:
1. A home security light bulb adapter comprising:
a bulb connector comprising male threads;
an electrical joint housing comprising a bulb socket comprising female threads;
a first ball joint connecting the bulb connector to the electrical joint housing such that the electrical joint housing is moveable along an x axis and a y axis relative to the bulb connector, wherein the bulb connector is electrically connected to the electrical joint housing, wherein the first ball joint comprises a first ball disposed within a first socket of the bulb connector and a second ball disposed within a second socket of the electrical joint housing;
a camera electrically connected to the bulb connector;
at least one sensor electrically connected to the bulb connector;
a wireless communications interface electrically connected to the bulb connector; and
a processor electrically connected to the bulb connector, wherein when the bulb connector is connected to a bulb fixture, the camera and the bulb socket are switched on when the sensors sense a motion, and the processor sends video signals to a remote device via the wireless communications interface.

2. The home security light bulb adapter of claim 1, further comprising a housing, wherein the sensors and the camera are coupled to the housing.

3. The home security light bulb adapter of claim 2, wherein the electrical joint housing electrically connects the housing, the bulb connector, and the bulb socket.

4. The home security light bulb adapter of claim 2, wherein the housing is coupled to the electrical joint housing by a second ball joint.

5. The home security light bulb adapter of claim 1, wherein the remote device wirelessly communicates with the processor via the wireless communications interface to turn the sensors on and off.

6. The home security light bulb adapter of claim 1, wherein the data is a live feed of the camera.

7. The home security light bulb adapter of claim 2, further comprising a speaker and a microphone coupled to the housing and each electrically connected to the bulb connector, wherein the microphone is switched on when the sensors sense a motion, wherein the processor sends audio signals to the remote device via the wireless communications interface.

8. The home security light bulb adapter of claim 7, wherein the remote device wirelessly communicates with the processor via the wireless communications interface to control an output of the speaker.

9. A home security light bulb adapter comprising:
a bulb connector comprising male threads;
an electrical joint housing comprising a bulb socket comprising female threads;
a first ball joint connecting the bulb connector to the electrical joint housing such that the electrical joint housing is moveable along an x axis and a y axis relative to the bulb connector, wherein the bulb connector is electrically connected to the electrical joint housing;
a camera electrically connected to the bulb connector;
at least one sensor electrically connected to the bulb connector;
a housing,
wherein the camera and the at least one sensor are coupled to the housing, and
wherein the housing is coupled to the electrical joint housing by a second ball joint;
a wireless communications interface electrically connected to the bulb connector; and
a processor electrically connected to the bulb connector, wherein when the bulb connector is connected to a bulb fixture, the camera and the bulb socket are switched on when the sensors sense a motion, and the processor sends video signals to a remote device via the wireless communications interface.

10. The home security light bulb adapter of claim 9, wherein the electrical joint housing electrically connects the housing, the bulb connector, and the bulb socket.

11. The home security light bulb adapter of claim 9, wherein the first ball joint comprises a first ball disposed within a first socket of the bulb connector and a second ball disposed within a second socket of the electrical joint housing.

12. The home security light bulb adapter of claim 9, wherein the remote device wirelessly communicates with the processor via the wireless communications interface to turn the sensors on and off.

13. The home security light bulb adapter of claim 9, wherein the data is a live feed of the camera.

14. The home security light bulb adapter of claim 9, further comprising a speaker and a microphone coupled to the housing and each electrically connected to the bulb connector, wherein the microphone is switched on when the sensors sense a motion, wherein the processor sends audio signals to the remote device via the wireless communications interface.

15. The home security light bulb adapter of claim 14, wherein the remote device wirelessly communicates with the processor via the wireless communications interface to control an output of the speaker.

16. A home security light bulb adapter comprising:
a bulb connector comprising male threads;
an electrical joint housing comprising a bulb socket comprising female threads;
a first ball joint connecting the bulb connector to the electrical joint housing such that the electrical joint housing is moveable along an x axis and a y axis relative to the bulb connector, wherein the bulb connector is electrically connected to the electrical joint housing,
wherein the first ball joint comprises a first ball disposed within a first socket of the bulb connector and a second ball disposed within a second socket of the electrical joint housing;
a camera electrically connected to the bulb connector;
at least one sensor electrically connected to the bulb connector;
a housing,
wherein the camera and the at least one sensor are coupled to the housing, and
wherein the housing is coupled to the electrical joint housing by a second ball joint;
a wireless communications interface electrically connected to the bulb connector; and
a processor electrically connected to the bulb connector, wherein when the bulb connector is connected to a bulb fixture, the camera and the bulb socket are switched on when the sensors sense a motion, and the processor sends video signals to a remote device via the wireless communications interface.

17. The home security light bulb adapter of claim 16, wherein the electrical joint housing electrically connects the housing, the bulb connector, and the bulb socket.

18. The home security light bulb adapter of claim 16, wherein the remote device wirelessly communicates with the processor via the wireless communications interface to turn the sensors on and off.

19. The home security light bulb adapter of claim 16, wherein the data is a live feed of the camera.

20. The home security light bulb adapter of claim 16, further comprising a speaker and a microphone coupled to the housing and each electrically connected to the bulb connector, wherein the microphone is switched on when the sensors sense a motion, wherein the processor sends audio signals to the remote device via the wireless communications interface.

\* \* \* \* \*